United States Patent Office 2,777,005
Patented Jan. 8, 1957

2,777,005

POLYMERIZABLE CYCLIC COMPOUNDS

Louis A. Errede, Bloomfield, and Billy F. Landrum, Belleville, N. J., assignors to The M. W. Kellogg Company, Jersey City, N. J., a corporation of Delaware No Drawing. Application October 14, 1953, Serial No. 386,106

20 Claims. (Cl. 260—668)

This invention relates to the production of stable concentrated compounds, in liquid and solid phase, which compounds have hitherto been known to exist only in a non-condensed, or vapor phase and in evanescent form.

Recently, a new class of useful polymers has been developed from the pyrolysis of p-xylene and other aromatic compounds of similar structure. It has been found that when p-xylene vapor is pyrolyzed at a temperature from about 700° C. to 1300° C. and at a total pressure not higher than about 400 mm. Hg for a period no longer than about one second and then cooled to about room temperature, a new and useful polymer is deposited. This polymer is ordinarily deposited as a tough, coherent film which has good insulating properties, extraordinary heat stability and extraordinary resistance to solvent action and to the action of corrosive liquids, such as sulfuric acid. It is useful in protective coatings and in electrical element insulation.

It has also been found that comparable polymers could be made by the pyrolysis of naphthalenes having methyl substituents in at least the 1 and 4 positions.

It has also been found that comparable polymer products are obtained when additional methyl groups are substituted in the nucleus of the p-xylene or the 1,4 dimethyl naphthalene.

It has also been found that fluorine and/or chlorine nuclear substituents may be present in the compound to be pyrolyzed and still yield useful polymeric products.

It has also been found that one or more hetero nitrogen atoms may be present in the ring or rings, provided no two hetero nitrogen atoms are vicinal to each other. In other words, each hetero nitrogen atom should be vicinal only to carbon atoms.

All of the aforesaid compounds undergo changes during the pyrolysis step to produce compounds capable of polymerization upon cooling. These product compounds or monomers have been shown to have an evanescent existence in the vapor state and have been shown to be readily reactive with iodine to produce 1,4 diiodomethyl benzene and corresponding compounds. Since the product compounds polymerize spontaneously in the temperature range used for quenching in the prior art, they have only been known in the vapor state in extremely low concentrations and have only been known to exist for very short times. The polymeric products, as deposited directly from the vapor state, while very useful, have not been developed to the point of achieving optimum and reproducable characteristics due to the difficulties of controlling instantaneous polymerization conditions.

It is an object of this invention to produce the aforesaid compounds in a stable concentrated form and in a condensed phase.

It is a further object of this invention to produce stable concentrated polymerizable cyclic compounds characterized by being readily reactable with iodine to produce a diiodo compound of the group consisting of 1,4 diiodomethyl benzene, 1,4 diiodomethyl naphthalene, corresponding heterocyclic diiodomethyl compounds having one to two six-membered rings and containing at least one hetero nitrogen atom vicinal only to carbon atoms, and the nuclear substitution products of the foregoing members with normally gaseous halogen atoms and with methyl groups.

It is a still further object of this invention to produce the aforesaid compounds or monomers in stable liquid solutions.

It is a still further object of this invention to produce the aforesaid compounds or monomers in stable solid mixtures.

It is a still further object of this invention to produce the aforesaid compounds in a stable concentrated form and in a condensed phase from which polymerization under controlled conditions is possible.

It is a still further object of this invention to produce the aforesaid compounds in a stable concentrated form and in a condensed phase from which copolymerization with similar compounds in controlled proportions is possible.

Other objects of this invention will be readily apparent to those skilled in the art.

These and other objects are accomplished by the following invention:

An aromatic compound of the group consisting of p-xylene, 1,4 dimethyl naphthalene, corresponding heterocyclic dimethyl compounds having from one to two six-membered rings and containing at least one hetero nitrogen atom vicinal only to carbon atoms, and the nuclear substitution products of the foregoing members with atoms of the normally gaseous halogens and with additional methyl groups is pyrolized at a temperature between about 700° C. and 1300° C. and a total pressure not higher than about 400 mm. Hg for a period of not more than one second and the pyrolized vapors are then quenched in a cold liquid to a temperature below about minus 45° C.

Among the specific aromatic hydrocarbons which can be pyrolized to produce the stable concentrated polymerizable cyclic compounds of this invention are: para-xylene, pseudocumene, durene, isodurene, prehnitene, pentamethylbenzene, hexamethylbenzene, 1,4-dimethyl naphthalene and 1,2,3,4,6,7-hexamethyl naphthalene.

The nitrogen-containing heterocyclic compounds which may be used as starting materials in this invention include those which have a similar structure to those of the corresponding aromatic carbocyclic compounds and which can be represented by a formula of the Kekule type. Among the specific heterocyclic compounds which are operative as starting materials for the production of the compounds of this invention are: 2,5-dimethyl pyrazine; 2,5-lutidine; 2,5-dimethyl pyrimidine; 5,8-dimethyl quinoline; 1,4-dimethyl isoquinoline; 5,8-dimethyl isoquinoline; 5,8-dimethyl quinazoline; 5,8-dimethyl quinoxaline; 2,3,5-trimethyl pyrazine, 2,3,5,6-tetramethyl pyrazine; 2,3,5-trimethyl pyradine; 2,4,5-trimethyl pyradine and 5,6,8-trimethyl quinoline.

The halogen substituents are limited to the normally gaseous halogens, namely chlorine and fluorine. These substituents, in the case of the dicyclic compounds, may be on the same ring as the methyl groups or on the other ring or on both rings. Where more than one halogen atom is present, they may be either the same halogen or different halogens. Among the specific halogen substituted compounds which may be used are 2-chloro-p-xylene, 2-fluoro-p-xylene, 2,5-dichloro-p-xylene, 2,5-difluoro-p-xylene, 2,3,5-trichloro-p-xylene, 2,3,5-trifluoro-p-xylene, 2,3,5,6-tetrachloro-p-xylene, 2,3,5,6-tetrafluoro-p-xylene, 2-chloro-3,5,6-trimethyl benzene, 6-chloro-1,4-dimethyl naphthalene, 2,3,6,7-tetrachloro-1,4-dimethyl naphthalene and 2,5-dimethyl-6-chloropyrazine.

Aromatic starting materials containing nuclearly substituted fluorine atoms may be prepared by introducing the fluorine atoms into the aromatic nucleus, one at a time, by the method of Balz and Schiemann, described in "Organic Reactions", volume 5, chapter 4, pages 194–216. The method comprises the reaction of the corresponding amino compound with nitric acid and fluoborate and the decomposition of the fluoborate to produce the desired aromatic fluoride, free nitrogen and borotrifluoride.

Similarly, aromatic starting materials containing nuclearly substituted chlorine atoms may be prepared by introducing the chlorine atoms into the aromatic nucleus, one at a time, by the well known Sandmeyer Reaction, as described in "Organic Synthesis", collective volume I, page 170. The method comprises the reaction of the corresponding amino compound with nitrous acid and hydrochloric acid and the decomposition of the resulting diazonium salt in the presence of cuprous chloride to produce the desired aromatic chloride and free nitrogen.

Amino groups may be introduced into the aromatic nucleus by well known methods, as by nitration of the aromatic compound with fuming nitric acid, followed by the reduction of the nitro compound produced by tin and hydrochloric acid.

Chlorine atoms may also be introduced into the aromatic nucleus by the reaction of the aromatic compound with elemental chlorine in the absence of light and in the presence of a Friedel-Crafts type catalyst, such as ferric chloride. If desired, chlorine atoms may be introduced into a nucleus already containing fluorine atoms, or vice versa.

The contact times most suitable for use in the pyrolysis step of the process of the invention depend largely on temperatures at which the pyrolysis is carried out. It has been found that the higher the temperature, the shorter is the contact time required to obtain optimum conversions and to reduce the loss of starting material not converted to the desired compounds.

The operative temperature range for the pyrolysis step is from about 700° C. to about 1300° C. and preferably within the range of about 950° C. to 1300° C. The contact time is preferably less than one second even at 700° C., while within the preferred pyrolysis temperature range it should be within the range of from about 0.1 to about 0.001 second.

The pyrolysis step is generally carried out in a tube or in a bank of tubes which may be heated electrically or by combustion. In the case of very short pyrolysis times, a heated grid may be used instead of a tube or tubes. Electrical heating is best accomplished by surrounding the individual pyrolysis tubes with resistance electrical heating elements. Combustion heating is best accomplished by surrounding the entire bank of tubes in a controlled combustion oven.

The actual contact time at pyrolysis temperatures may be extremely difficult to determine. For the purpose of convenience, it is assumed that the residence time of the vapors in a pyrolysis tube is equivalent to the contact time at pyrolysis temperature. This approximation is most accurate when the aromatic vapor is preheated close to pyrolysis temperatures before introduction into a pyrolysis tube and is most accurate when heating efficiency of the pyrolysis tube is high. In any case, however, the term "contact time" as used herein is the total time in the pyrolysis tube and is obtained by dividing the length of the tube by the average linear velocity of the vapors, taking into consideration changes in the volume of the vapors caused by change in temperature and by change in composition during the course of pyrolysis.

To avoid excessive cracking it is necessary that the pyrolysis be conducted at sub-atmospheric pressures. For best results the aromatic vapor should be present at partial pressures not substantially higher than 150 mm. Hg absolute. Excellent results are obtained when the partial pressure of the aromatic compound is 10 mm. or somewhat below. The pyrolysis can be conducted in the presence of an inert gas, such as carbon dioxide, steam or nitrogen, for example, particularly when the partial pressure of the aromatic hydrocarbon is 10 mm. Hg. or below. In all cases the total pressure employed should be below 400 mm. Hg absolute.

The products of this invention are formed spontaneously on quenching the pyrolyzed vapor in a liquid to a temperature of about minus 45° C. or below. It is important that the quenching step be extremely rapid, since it is known that polymeric products form quickly at about room temperature, and in fact, form quickly at temperatures above about minus 45° C.

The actual temperature above which rapid polymerization takes place, depends, to some extent, upon other polymerization conditions. In the presence of a relatively large amount (e. g., about 20% by weight) of a polymerization inhibitor, such as a mixture of terpenes, the temperature for initiation of rapid polymerization is about minus 45° C., as indicated above. In the absence of a polymerization inhibitor, and in the absence of a polymerization initiator, such as atmospheric oxygen, rapid polymerization is initiated at temperatures above about minus 55° C. In the presence of substantial amounts of atmospheric oxygen, relatively rapid polymerization takes place, even at minus 80° C., although the polymers are stable at the boiling point of liquid nitrogen.

The stability of the aforementioned products or monomers is of an order which makes practical the handling, measuring and control of the monomers in polymerization and other reactions. In other words, the losses by polymerization over a period of several hours are negligible.

The rapid quench is ordinarily accomplished by passing the pyrolyzed vapors directly into a relatively large volume of stirred liquid maintained at the desired low temperature. The desired compounds pass directly from the vapor state into solution in the cold liquid until the limit of solubility is reached and then it begins to precipitate out in the solid phase. Other vapors from the pyrolysis step, principally unconverted starting material, also pass into solution in the cold liquid until the solubility limit and then also precipitate out in the solid phase. Thus, the desired compounds of this invention are ordinarily recovered from the quenching step in mixed solution or in mixed solid phase.

The liquid used for quenching may be of any composition which remains liquid in the necessary temperature range and which has a relatively low partial pressure, consistent with the upper total pressure limit of 400 mm. Hg and preferably low enough to permit operation below about 10 mm. Hg. The liquid should also be substantially non-reactive with the compounds formed, although liquids which react to some slight degree with the compounds formed, may be used. Among the specific liquids which may be used are the paraffinic and cycloparaffinic hydrocarbons of low freezing point, such as hexane, petroleum ether, cyclopentane and 1,4-dimethyl cyclohexane; the aromatic hydrocarbons of low freezing point, such as toluene, ethyl benzene, o-ethyl toluene and m-diethyl benzene; the halogenated hydrocarbons of low freezing point, such as o-chloro ethyl benzene, o-fluoro toluene and 1,1-dichloroethane; carbonyl compounds of low freezing point, such as ethyl acetate, methyl isobutyrate, isobutyl formate, acetone, methyl ethyl ketone and methyl isobutyl ketone; ethers of low freezing point, such as diethyl ether, ethyl n-propyl ether and tetrahydrofurane; alcohols of low freezing point, such as methanol, ethanol and isopropyl alcohol; and other normally liquid compounds of low freezing point, such as carbon disulfide. If desired, liquids of low freezing point may be obtained by the blending of two or more compounds of higher freezing point. For example, mixtures of carbon tetrachloride and chloroform may be used.

If desired, the quench step may be made continuous by known manipulative procedures; for example, by continuous addition of cold fresh liquid and continuous withdrawal of cold concentrated solutions or cold concentrated slurry.

The stable compounds of this invention have empirical formulas similar to those of the starting materials, except that they lack two hydrogen atoms. Structurally, the molecules are believed to be in the dimethylene quinoid state or in the diradical state or a mixture of both, depending upon the energy level. For example, the compound obtained from the pyrolysis of p-xylene followed by immediate quenching of the pyrolyzed vapors may have the quinoid formula

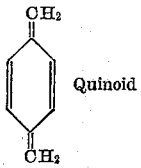
Quinoid or may have the diradical formula

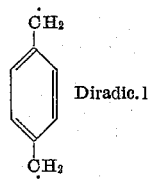
Diradical or may be a mixture of both. In any case, these compounds react readily with elemental iodine, even at temperatures of the order minus 55° C. to produce the corresponding diiodomethyl compounds.

The polymers produced from the compounds of this invention are essentially similar to those produced directly from the vapor state, as disclosed in the prior art. All of the polymers are relatively high in softening point, all of them softening at temperatures well above 200° C., and the polymer from p-xylene softening at nearly 400° C.

All of the polymers are insoluble at ordinary temperatures in low boiling organic solvents, but soluble to some extent at elevated temperatures in high boiling aromatic solvents such as benzyl benzoate, phenanthrene and polycyclic aromatic fractions obtained from the distillation of coal tar products and from petroleum cracking.

All of the polymers produced will resist attack by cold concentrated hydrochloric, nitric or sulfuric acid and by hot concentrated hydrochloric acid. However, the polymers from pseudocumene, durene and isodurene are attacked by hot concentrated nitric and sulfric acids.

The softening points of the various polymers also vary. Thus, the polymers from p-xylene, 1,4-dimethyl naphthalene and durene do not soften to any noticeable extent below 300° C. The pseudocumene polymer does not soften below 250° C. but softens at about 280° C. and the isodurene product does not soften below 200° C. but softens at about 240° C.

The polymers from pseudocumene and isodurene can be molded at a temperature of 300 to 320° C. under a pressure of one-half ton per square inch to give flexible products.

The polymers from durene and 2 chloro p-xylene can also be molded to give a tough, inflexible product but the product from p-xylene is difficult to mold and yields a brittle product. The p-xylene polymer may, however, be suitably used in comminuted form as a filler for compositions in which its properties are valuable and may also be directly deposited from liquid phase as a coating in film form.

The stable concentrated compounds of this invention may also be copolymerized with each other in controlled proportions and under controlled conditions. Copolymers of compounds of this type have been known to have advantageous properties and have been prepared by direct polymerization from the vapor phase. However, such polymerization is extremely difficult to control and to duplicate.

By the utilization of the stable concentrated compounds of our invention it becomes possible to blend these compounds with each other and/or with promoters or catalysts in any desired proportion and concentration and to polymerize them under controlled conditions of temperature and time.

*Example 1*

P-xylene vapor, at 5 mm. Hg pressure and preheated to 700° C., is led through a pyrolysis tube of 2.5 cm. diameter and 30 cm. in length at such a velocity that the average contact time is 0.05 second and heated to a pyrolysis temperature of 1000° C. The pyrolized vapors are passed directly to the top of a 6 liter 3-necked flask containing 3.8 liters of a chloroform-carbon tetrachloride mixture (1 to 1 by volume) which is cooled in a bath of dry ice-acetone to a temperature of minus 80° C. The chloroform-carbon tetrachloride mixture is continuously agitated to prevent localized heating. A deposit of polymer is rapidly formed on the uncooled upper surface of the flask and on the upper portion of the agitator. The liquid itself remains transparent for about two hours until the saturation limit is reached and then becomes opaque as solid p-xylene and solid monomer precipitate out. The flask is disconnected from the train at the end of the run and the solid precipitate containing p-xylene and solid monomer is removed by filtration. The mother liquor is then added at minus 80° C. to a solution of chloroform-carbon tetrachloride containing an excess of iodine. The mixture is allowed to warm to room temperature with occasional shaking, but does not change in appearance. The excess iodine is neutralized with aqueous sodium thiosulfate, and the organic layer is washed with water to remove all traces of inorganic salts. The chloroform and carbon tetrachloride are removed under vacuum and the dry residue is recrystallized from methanol to give a light brown crystalline compound having a melting point of 176–177° C. This corresponds to the reported melting point for 1,4 di-iodomethyl benzene.

The solid filter residue, containing p-xylene and monomer, is also added to an excess of iodine in chloroform carbon tetrachloride solution and worked up as indicated above to yield 1,4 di-iodomethyl benzene, M.P. 176 to 177° C.

A second charge of monomer in chloroform-carbon tetrachloride solution is produced using the same pyrolysis conditions, and the content of the flask, instead of being added to iodine, is allowed to warm to room temperature to form an insoluble polymer in an amount corresponding to a 14 percent conversion of p-xylene.

*Example 2*

2-fluoro p-xylene, at 6 mm. Hg pressure and preheated to 500° C. is led through the pyrolysis tube of Example 1 at such a velocity that the average contact time is 0.06 second and heated to a pyrolysis temperature of 950° C. The pyrolized vapors are passed directly to the top of the condenser flask of Example 1, containing 3.8 liters of toluene which is cooled in a bath of dry ice-acetone to a temperature of minus 80° C. The toluene solution is continuously agitated to prevent localized heating. A deposit of polymer is rapidly formed on the uncooled upper surface of the flask and on the upper portion of the agitator. The liquid itself remains transparent for about 4 hours until the saturation limit is reached and then becomes opaque as solid 2-fluoro p-xylene and solid monomer precipitate out of solution. The condenser flask is disconnected from the train and the slurry poured directly into an excess of iodine in toluene solution, cooled to minus 80° C. The solution is allowed to warm to room temperature with no change visible, and the excess iodine is neutralized with aqueous sodium thiosulfate. The organic layer is washed with water to remove inorganic salts and subsequently evaporates to dryness under vacuum. The solid residue is recrystallized from methanol to form light amber needles of 2-fluoro 1,4-di-iodomethyl benzene, melting at 148 to 150° C. The melting point agrees with that reported for the compound.

A second charge of monomer in toluene solution is produced using the same pyrolysis conditions, and the contents of the condenser flask, instead of being added to iodine, is allowed to warm to room temperature to form an insoluble polymer in an amount corresponding to a 9 percent conversion of 2-fluoro p-xylene.

*Example 3*

1,4-dimethyl naphthalene vapor, at 4 mm. Hg pressure and preheated to 600° C. is led through the pyrolysis tube of Example 1 at such a velocity that the average contact time is 0.04 second and heated to a pyrolysis temperature of 975° C. The pyrolysis vapors are passed directly to the top of the condenser flask of Example 1, containing 3.8 liters of hexane which is cooled in a bath of dry ice-acetone to a temperature of minus 60° C. The hexane solution is continuously agitated to prevent localized heating. A deposit of polymer is rapidly formed on the uncooled upper surface of the flask and on the upper portion of the agitator. The liquid itself remains transparent for about 2½ hours until the saturation limit is reached and then becomes opaque as solid 1,4-dimethyl naphthalene and solid monomer precipitate out of solution. The condenser flask is disconnected from the train at the end of the run and the slurry is poured directly into an excess of iodine dissolved in hexane at minus 60° C. The resultant solution is allowed to warm to room temperature with no change visible, and the excess iodine is neutralized with aqueous sodium thiosulfate. The organic layer is washed with water and subsequently evaporates to dryness under vacuum. The solid residue is recrystallized from methanol to form slightly greenish needles of 1,4 di-iodomethyl naphthalene, M.P. 151 to 153° C.

A second charge of the monomer in hexane is produced using the same pyrolysis conditions and the contents of the condenser flask, instead of being added to iodine, is allowed to warm to room temperature to form an insoluble polymer in an amount corresponding to an 8% conversion of 1,4 dimethyl naphthalene.

*Example 4*

Pseudocumene vapor, at 5 mm. Hg pressure and preheated to 600° C., is led through the pyrolysis tube of Example 1 at such a velocity that the average contact time is 0.08 second and heated to a pyrolysis temperature of 900° C. The pyrolized vapors are passed directly to the top of the condenser flask of Example 1, containing 3.8 liters of acetone which is cooled in a bath of dry ice-acetone to a temperature of minus 60° C. The acetone in the condenser flask is continuously agitated to prevent localized heating. A deposit of polymer is rapidly formed on the uncooled upper surface of the flask and on the upper portion of the agitator. The liquid itself remains transparent for about two hours until the saturation limit is reached and then becomes opaque as solid pseudocumene and solid monomer precipitate out of solution. The flask is disconnected from the train at the end of the run and allowed to warm to room temperature to form an insoluble polymer in an amount corresponding to a 10% conversion of pseudocumene.

We claim:

1. A stable concentrated polymerizable cyclic compound in a condensed phase characterized at least at one energy level by having a quinoid structure and characterized by being readily reactable with iodine to produce a diiodo compound of the group consisting of 1,4 diiodomethyl benzene, 1,4 diiodomethyl naphthalene, corresponding heterocyclic diiodomethyl compounds having one to two six-membered rings and containing at least one hetero nitrogen atom vicinal only to carbon atoms, and the nuclear substitution products of the foregoing members with normally gaseous halogen atoms and with methyl groups.

2. A stable concentrated polymerizable cyclic compound in a condensed phase characterized at least at one energy level by having a quinoid structure and characterized by being readily reactable with iodine to produce 1,4 diiodomethyl benzene.

3. A stable concentrated polymerizable cyclic compound in a condensed phase characterized at least at one energy level by having a quinoid structure and characterized by being readily reactable with iodine to produce 1,4 diiodomethyl benzene substituted in the nucleus with at least one normally gaseous halogen atom.

4. A stable concentrated polymerizable cyclic compound in a condensed phase characterized at least at one energy level by having a quinoid structure and characterized by being readily reactable with iodine to produce 1,4 diiodomethyl naphthalene.

5. A stable concentrated polymerizable cyclic compound in a condensed phase characterized at least at one energy level by having a quinoid structure and characterized by being readily reactable with iodine to produce 1,4 diiodomethyl benzene substituted in the nucleus with at least one methyl group.

6. A liquid solution maintained at a temperature below about minus 45° C. and containing a stable concentrated polymerizable cyclic compound characterized at least at one energy level by having a quinoid structure and characterized by being readily reactable with iodine to produce a diiodo compound of a group consisting of 1,4 diiodomethyl benzene, 1,4 diiodomethyl naphthalene, corresponding heterocyclic diiodomethyl compounds having 1 to 2 six-membered rings and containing at least one hetero nitrogen atom vicinal only to carbon atoms, and the nuclear substitution products of the foregoing members with normally gaseous halogen atoms and with methyl groups and containing a liquid having a freezing point below about −45° C. and selected from the group consisting of paraffinic and cyclo-paraffinic hydrocarbons, aromatic hydrocarbons, halogenated hydrocarbons, carbonyl compounds, ethers, alcohols, carbon disulfide and mixtures thereof.

7. A liquid solution maintained at a temperature below about minus 45° C. and containing a stable concentrated polymerizable cyclic compound characterized at least at one energy level by having a quinoid structure and characterized by being readily reactable with iodine to produce 1,4 diiodomethyl benzene and containing a liquid having a freezing point below about −45° C. and selected from the group consisting of paraffinic and cyclo-paraffinic hydrocarbons, aromatic hydrocarbons, halogenated hydrocarbons, carbonyl compounds, ethers, alcohols, carbon disulfide and mixtures thereof.

8. A solid phase composition maintained at a temperature below about minus 45° C. and containing a stable concentrated polymerizable cyclic compound characterized at least at one energy level by having a quinoid structure and characterized by being readily reactable with iodine to produce 1,4 diiodomethyl benzene.

9. A method of preparing in stable form and in a condensed phase, a cyclic compound, capable of polymerization, which comprises pyrolyzing an aromatic compound of the group consisting of p-xylene, 1,4 dimethyl naphthalene, corresponding heterocyclic dimethyl compounds having from one to two six-membered rings and containing at least one hetero nitrogen atom vicinal only to carbon atoms, and the nuclear substitution products of the foregoing members with normally gaseous halogen atoms and with additional methyl groups at a temperature between about 700° C. and 1300° C. and at a total pressure not higher than about 400 mm. Hg for a period of not more than one second, quenching the pyrolyzed vapors to a temperature below about minus 45° C. in a cold, substantially non-reactive liquid having a partial pressure at the quench temperature below about 10 mm. Hg.

10. The method of claim 9 wherein quenching is accomplished by passing the vapors into a liquid bath containing a polymerization inhibitor and maintained at a temperature of about minus 45° C.

11. A method of preparing in stable form and in a condensed phase, a cyclic compound acapble of polymerization, which comprises pyrolyzing p-xylene at a temperature between about 700° C. and 1300° C. at a total pressure not higher than about 400 mm. Hg, and for a period not higher than about one second, quenching the pyrolyzed vapor to a temperature not higher than about minus 45° C. in a cold, substantially non-reactive liquid having a partial pressure at the quench temperature below about 10 mm. Hg.

12. A method of preparing in stable form and in a condensed phase, a cyclic compound capable of polymerization, which comprises pyrolyzing 1,4 dimethyl naphthalene at a temperature between about 700° C. and 1300° C. at a total pressure not higher than about 400 mm. Hg, and for a period not higher than about one second, quenching the pyrolyzed vapor to a temperature not higher than about minus 45° C. in a cold, substantially non-reactive liquid having a partial pressure at the quench temperature below about 10 mm. Hg.

13. A method of preparing in stable form and in a condensed phase, a cyclic compound capable of polymerization, which comprises pyrolyzing 2 chloro-p-xylene at a temperature between about 700° C. and 1300° C. at a total pressure not higher than about 400 mm. Hg, and for a period of not higher than about one second, quenching the pyrolyzed vapor to a temperature not higher than about minus 45° C. in a cold, substantially non-reactive liquid having a partial pressure at the quench temperature below about 10 mm. Hg.

14. A method of preparing in stable form and in a condensed phase, a cyclic compound capable of polymerization, which comprises pyrolyzing 2 fluoro-p-xylene at a temperature between about 700° C. and 1300° C. at a total pressure not higher than about 400 mm. Hg, and for a period not higher than about one second, quenching the pyrolyzed vapor to a temperature not higher than about minus 45° C. in a cold, substantially non-reactive liquid having a partial pressure at the quench temperature below about 10 mm. Hg.

15. The method of claim 9 wherein the aromatic compound is pyrolyzed at a temperature above about 950° C. and pressure below about 10 mm. Hg for a period not greater than .1 second and wherein the pyrolyzed vapors are passed, in the substantial absence of atomspheric oxygen, into a quench liquid comprising a mixture of chloroform and carbon tetrachloride maintained at a temperature of about minus 80° C.

16. The method of claim 11 wherein the p-xylene is pyrolyzed at a temperature above about 950° C. and pressure below about 10 mm. Hg for a period not greater than .1 second and wherein the pyrolyzed vapors are passed, in the substantial absence of atmospheric oxygen, into a quench liquid comprising toluene maintained at a temperature of about minus 80° C.

17. The method of claim 11 wherein the p-xylene is pyrolyzed at a temperature above about 950° C. and pressure below about 10 mm. Hg for a period not greater than .1 second and wherein the pyrolyzed vapors are passed, in the substantial absence of atmospheric oxygen, into a quench liquid comprising hexane maintained at a temperature of about minus 80° C.

18. The method of claim 12 wherein the 1,4-dimethyl naphthalene is pyrolyzed at a temperature above about 950° C. and pressure below about 10 mm. Hg for a period not greater than .1 second and wherein the pyrolyzed vapors are passed in the substantial absence of atmospheric oxygen into the substantially inert quench liquid which is maintained at a temperature of about minus 80° C.

19. The method of claim 13 wherein 2 chloro-p-xylene is pyrolyzed at a temperature above about 950° C. and pressure below about 10 mm. Hg for a period not greater than .1 second and wherein the pyrolyzed vapors are passed in the substantial absence of atmospheric oxygen into the substantially inert quench liquid which is maintained at a temperature of about minus 80° C.

20. The method of claim 14 wherein 2 fluoro-p-xylene is pyrolyzed at a temperature above about 950° C. and pressure below about 10 mm. Hg for a period not greater than .1 second and wherein the pyrolyzed vapors are passed in the substantial absence of atmospheric oxygen into the substantially inert quench liquid which is maintained at a temperature of about minus 80° C.

References Cited in the file of this patent

FOREIGN PATENTS

| | | |
|---|---|---|
| 647,111 | Great Britain | Dec. 6, 1950 |
| 650,947 | Great Britain | Mar. 7, 1951 |
| 673,651 | Great Britain | June 11, 1952 |
| 673,652 | Great Britain | June 11, 1952 |